(12) United States Patent
Jacobs (10) Patent No.: US 12,417,439 B2
(45) Date of Patent: Sep. 16, 2025

(54) OFFLINE MACHINE LEARNING FOR AUTOMATIC ACTION DETERMINATION OR DECISION MAKING SUPPORT

(71) Applicant: NEC Laboratories Europe GmbH, Heidelberg (DE)

(72) Inventor: Tobias Jacobs, Heidelberg (DE)

(73) Assignee: NEC CORPORATION, Tokyo (JP)

(*) Notice: Subject to any disclaimer, the term of this patent is extended or adjusted under 35 U.S.C. 154(b) by 676 days.

(21) Appl. No.: 17/848,453

(22) Filed: Jun. 24, 2022

(65) Prior Publication Data

US 2023/0306377 A1    Sep. 28, 2023

Related U.S. Application Data

(60) Provisional application No. 63/322,666, filed on Mar. 23, 2022.

(51) Int. Cl.
*G06N 20/00* (2019.01)
*G06Q 10/04* (2023.01)
*G06Q 10/20* (2023.01)

(52) U.S. Cl.
CPC ............ *G06Q 10/20* (2013.01); *G06N 20/00* (2019.01); *G06Q 10/04* (2013.01)

(58) Field of Classification Search
CPC ........ G06Q 10/20; G06Q 10/04; G06N 20/00; G06N 7/01
See application file for complete search history.

(56) References Cited

U.S. PATENT DOCUMENTS 6,738,748 B2    5/2004  Wetzer
11,783,206 B1 * 10/2023  Makwana ............ G06N 20/10
                                                  706/12

(Continued)

FOREIGN PATENT DOCUMENTS

EP         3379463 A1 *  9/2018

OTHER PUBLICATIONS

Joachims, et al., "Deep Learning with Logged Bandit Feedback," *International Conference on Learning Representations 2018*, pp. 1-12, Apr. 30-May 3, 2018, International Conference on Representation Learning, La Jolla, CA, USA.

(Continued)

*Primary Examiner* — Jorge A Casanova
(74) *Attorney, Agent, or Firm* — Leydig, Voit & Mayer, Ltd.

(57) ABSTRACT

A method for action determination includes training a first action prediction model with a desired outcome subset of a dataset having triples of: state; actions; and outcome. The first prediction model is configured to receive an input state and to output an action selection probability, which represents a prediction of a probability of achieving a first desired outcome for each action. The method further includes training a second action prediction model with the entire dataset to minimize a total loss over all actions. The second action prediction model is configured to receive the input state and to output an unconditional action selection probability of taking each action for the input state. The method can be practically applied to machine learning and artificial intelligence use cases including, but not limited to, medical/healthcare, email filtering, speech recognition, and computer vision, to optimize processes or support decision making.

15 Claims, 5 Drawing Sheets

(56) References Cited

U.S. PATENT DOCUMENTS

| | | | |
|---|---|---|---|
| 11,790,398 B2* | 10/2023 | Soederberg | G06Q 30/0255 |
| | | | 705/14.53 |
| 2011/0059427 A1* | 3/2011 | Hans | G05B 13/0265 |
| | | | 434/322 |
| 2021/0295204 A1* | 9/2021 | Bhide | G06N 5/04 |
| 2021/0350271 A1* | 11/2021 | Ross | G06N 5/04 |
| 2022/0019778 A1* | 1/2022 | Huang | G06N 20/00 |
| 2022/0164702 A1* | 5/2022 | Engel | G06N 7/01 |
| 2022/0284533 A1* | 9/2022 | Li | G06N 3/044 |
| 2023/0334363 A1* | 10/2023 | Bouaziz | G06N 20/00 |
| 2024/0095605 A1* | 3/2024 | Fylstra | G06N 3/047 |
| 2024/0169267 A1* | 5/2024 | Rakocz | G06N 3/09 |
| 2024/0393750 A1* | 11/2024 | Malladi | G05B 13/0265 |
| 2025/0103682 A1* | 3/2025 | Ma | G06F 17/18 |
| 2025/0137675 A1* | 5/2025 | Lessans | F24F 11/56 |

OTHER PUBLICATIONS

Levine, et al., "Offline reinforcement learning: Tutorial, review, and perspectives on open problems," *arXiv*, pp. 1-43, Nov. 1, 2020, Cornell University Library, Ithaca, NY, USA.

Qian, et al., "Supervised and Semi-Supervised Deep Probabilistic Models for Indoor Positioning Problems," *Elsevier*, pp. 1-12, Mar. 16, 2021, Elsevier, Amsterdam, NL.

Farsi, et al., "On Short-Term Load Forecasting Using Machine Learning Techniques and a Novel Parallel Deep LSTM-CNN Approach," *IEEE Access* 9, pp. 31191-31212, Feb. 18, 2021, Institute for Electrical and Electronics Engineers, Piscataway, NJ, USA.

* cited by examiner

OFFLINE MACHINE LEARNING FOR AUTOMATIC ACTION DETERMINATION OR DECISION MAKING SUPPORT

CROSS-REFERENCE TO RELATED APPLICATION

Priority is claimed to U.S. Provisional Patent Application No. 63/322,666, filed on Mar. 23, 2022, the entire disclosure of which is hereby incorporated by reference herein.

FIELD

The present invention relates to a method, system and computer-readable medium for offline machine learning for automatic action determination.

BACKGROUND

Machine learning (ML) generally encompasses the field of computer algorithms that improve automatically through experience and by the use of data (with or without human supervision). For example, machine learning algorithms may build a model based on sample data (i.e., training data) in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

Within the field of machine learning, there are several different subsets. One of which is directed to solving a class of problems for learning or selecting the "best" action to cover the needs of a given case. Moreover, within this subset, there is a further subset class of "offline" machine learning called offline action selection. Offline action selection solves offline learning problems that relate to selecting the "best" action, where a historical log of past cases, selected actions, and case outcomes (successful or unsuccessful) are available as reference data.

In principle, the inventors have recognized that several potential machine learning solutions may be applicable to offline action selection. For example, the problem could be modeled as a "contextual bandit." The case information could be represented by the bandit state, and a machine learning agent can select one action given the state information. Each action leads to a reward, where the unknown probability distribution over rewards depends on the given state and chosen action, and the agent is learning an action selection policy to optimize the expected reward. In an offline action selection setting, a dataset consisting of past triples (state, action, reward) may be available for training such an agent. See, e.g., Joachims, Thorsten, Adith Swaminathan, and Maarten de Rijke, "Deep learning with logged bandit feedback," International Conference on Learning Representations (2018) (the entire contents of which are hereby incorporated by reference herein). The inventors have recognized, however, that one of the limitations of such as bandit model is that it models a single-step process, with only a single action applied.

The inventors have further recognized that one method which may overcome the limitations of the contextual bandit approach could be to apply Reinforcement Learning (RL) for full Markov Decision Problems (MDP). Here, applying an action to a given state will bring the system into a new state, from which the next action can be applied, until, after multiple steps, the system is in its terminal state. Reward signals are provided after each action, and the objective is to learn an action selection policy to optimize the total reward. There are several algorithms for learning policies from a given dataset of trajectories that could be used. See, e.g., Levine, Sergey, et al., "Offline reinforcement learning: Tutorial, review, and perspectives on open problems," arXiv: 2005.01643 (2020) (the entire contents of which are hereby incorporated by reference herein) However, the inventors have recognized that learning policies in the full MDP setting from given trajectories suffers from problems that originate from the high variance of the outcome of multi-step processes. The high variance leads to the requirement of huge datasets (which in turn leads to large memory, runtime, and energy requirements) to obtain reliable estimates of the performance of new policies, which in turn makes it difficult to construct good policies.

SUMMARY

In an embodiment, the present disclosure provides a machine learning method for automatic action determination. The method includes training a first action prediction model with a desired outcome subset of a historical dataset. The historical dataset has a plurality of triples, with each of the triples having a corresponding set of: a past state; a set of actions that were applied; and an outcome after the set of actions were applied. The desired outcome subset is a selection of the triples from the historical dataset that have a first desired outcome as the outcome after the set of actions were applied. The first prediction model is configured to receive an input state and to output an action selection probability under an assumption of the desired outcome, which represents a prediction of a probability of achieving the first desired outcome for each action included in a set of possible actions. The method further includes: training a second action prediction model with the entire historical dataset to minimize a total binary cross-entropy loss over all the actions in in the set of possible actions, the second action prediction model being configured to receive the input state and to output an unconditional action selection probability, which represents a prediction of a probability of taking each of the actions included in the set of possible actions for the input state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides machine learning systems and methods with improvements rooted in the field of computer processing, and in particular improvements to the field of machine learning. An improvement provided by aspects of the present disclosure includes computing near-optimal action selection from given historical data in a simple and robust way. Another improvement provided by aspects of the present disclosure is that it provides enhanced stability, especially in comparison to state of the art reinforcement learning methods, which can suffer from stability problems, even when designed for much more complicated problem setups. Moreover, the present disclosure also provides systems and methods that have improved computational efficiency compared to the state of the art. For example, state of the art methods require much more heavy machinery (e.g. RL for full MDP), which comes with more stability problems and requires much more data and computational resources. Additionally, embodiments of present disclosure can operate without the need of consecutive and successive action determinations, reducing the memory and computing capacity requirements of other state of the art approaches, e.g., RL for full MDP. Therefore, implementations of the present disclosure are particularly well suited for solving problems for various systems and methods where a particular order of action of the application is not essential for success.

Embodiments of the present disclosure can be addressed to a class of offline learning problems that related to selecting the "best" action to cover the needs of a given case. In embodiments of the present disclosure, each action partially covers some needs of a given case, but explicit information about the cases' needs or the action effects, in terms of those needs, might not be provided. In this offline learning problem class, because the action assignment policies are to be learned from the already-available reference data, explorative interactions with new cases might not be performed.

According to a first aspect of the present disclosure, a machine learning method is provided, the method including:
  i) receiving a historical dataset including recorded actions; and determining the future action whose membership in the data set will maximize a probability of a successful process outcome;
  ii) where the maximizing, over all actions, the success probability resulting from the action includes maximizing a ratio of (a) the action selection probability under an assumption of success; and (b) an unconditional action selection probability; and/or iii) prior to operation ii, training a pair of action prediction models, where one of the models is trained with the historical records with positive outcome, providing a model that produces the action selection probability under an assumption of success (see ii.a), and the other one is trained with all historical records, providing a model that produces the unconditional action selection probability (see ii.b); and combining the prediction results of the two models (the prediction results being obtained according to Operation ii) to obtain a most promising next action; and/or
  iv) training an additional action prediction model for an additional (different) set of desired outcomes, e.g., producing an action selection probability under an assumption success with a different desired outcome as compared to operation ii.a; and combining the additional prediction model together with the already existing model that was trained with all historical records, in order to obtain the most promising next action for achieving the additional outcome; and/or
  v) training an action prediction model with the historical records where the desired outcome was not achieved, and combining the resulting model output with the output of the model that was trained with all historical records using minimization instead of the maximization performed in operation ii, in order to have an alternative (and potentially more reliable) method for selecting the most promising next action.

According to a second aspect of the present disclosure, a machine learning method is provided, the method including:
  A) training a pair of models, M and M+, with a historical dataset D comprising: (state, action set, outcome)-records,
    Ai) where the first model M is trained with all records from the historical dataset D to predict the probability of each action being included in an action set for a particular input state, and
    Aii) where the second model M+ is trained with the records from D that have a positive outcome to predict the probability of each action being included in an action set under the condition that the outcome is within the set of desired outcomes; and/or
  B) given a new state, evaluating the pair of models to predict the probabilities of all actions, and computing the pairwise ratio of the probabilities; and/or
  C) selecting, as the action to be performed, the action which maximizes the ratio computed in Operation B.

A third aspect of the present disclosure provides a machine learning method for automatic action determination. The method includes training a first action prediction model with a desired outcome subset of a historical dataset. The historical dataset has a plurality of triples, each of the triples having a corresponding set of: a past state; a set of actions that were applied; and an outcome after the set of actions were applied. The desired outcome subset is a selection of the triples from the historical dataset that have a first desired outcome as the outcome after the set of actions were applied. The first prediction model is configured to receive an input state and to output an action selection probability under an assumption of the desired outcome, which represents a prediction of a probability of achieving the first desired outcome for each action included in a set of possible actions. The method further includes: training a second action prediction model with the entire historical dataset to minimize a total binary cross-entropy loss over all the actions in in the set of possible actions, the second action prediction model being configured to receive the input state and to output an unconditional action selection probability, which represents a prediction of a probability of taking each of the actions included in the set of possible actions for the input state.

According to a fourth aspect of the present disclosure, the machine learning method of the fourth aspect further includes: using the first action prediction model, determining the action selection probability under the assumption of the desired outcome based on using a new state as the input state; using the second action prediction model, determining the unconditional action selection probability based on using the new state as the input state; and determining, as a future action, the action from the set of possible actions that maximizes a pairwise ratio of the action selection probability under the assumption of the desired outcome over the unconditional action selection probability for the new state.

According to a fifth aspect of the present disclosure, the machine learning method of the fourth aspect further includes: training a third action prediction model with a second desired outcome subset of the historical dataset, the second desired outcome subset being a second selection of the triples from the historical dataset that have one outcome from a second set of desired outcomes as the outcome after the set of actions were applied, and the third prediction model being configured to receive the input state and to output an action selection probability under an assumption of the second set of desired outcomes, which represents a prediction of a probability of achieving one of the outcomes from the second set desired outcomes for each action included in the set of possible actions; and using the third action prediction model, determining the action selection probability under the assumption of the second set of desired outcomes based on using a further state as the input state; using the second action prediction model, determining the unconditional action selection probability based on using the further state as the input state; and determining, as a next action, the action from the set of possible actions that maximizes a pairwise ratio of the action selection probability under the assumption of the second set of desired outcomes over the unconditional action selection probability for the further state.

According to a sixth aspect of the present disclosure, the machine learning method of the fifth aspect has the second set of desired outcomes not including the first desired outcome.

According to a seventh aspect of the present disclosure, the machine learning method of any of the fourth through sixth aspects further includes: training a third action prediction model with an undesirable outcome subset of the historical dataset, the undesirable outcome subset being another selection of the triples from the historical dataset that do not have the first desired outcome as the outcome after the set of actions were applied, and the third prediction model being configured to receive the input state and to output an action selection probability under an assumption of undesirable outcome, which represents a prediction of a probability of achieving an outcome that is not the first desired outcome for each action included in the historical dataset; and using the third action prediction model, determining the action selection probability under the assumption of the undesirable outcome based on using the new state as the input state; and determining, as an alternative action, the action from the set of possible actions that minimizes a pairwise ratio of the action selection probability under the assumption of the undesirable outcome over the unconditional action selection probability for the new state.

According to an eighth aspect of the present disclosure, the machine learning method of any of the fourth through seventh aspects further includes: executing the future action, the next action, and/or the alternative action.

According to an ninth aspect of the present disclosure, the machine learning method of the eighth aspect further includes: determining a further state resulting from executing the future action in the new state; using the first action prediction model, determining the action selection probability under the assumption of the desired outcome based on using the further state as the input state; using the second action prediction model, determining the unconditional action selection probability based on using the further state as the input state; determining, as a next action, the action from the set of possible actions that maximizes the pairwise ratio of the action selection probability under the assumption of the desired outcome over the unconditional action selection probability for the further state; and executing the next action.

According to a tenth aspect of the present disclosure, the machine learning method of any of the fourth through ninth aspects further includes having the historical dataset include: past maintenance statuses for a set of technical devices providing the state for each of the triples; past maintenance, repair, or replacement procedures providing the actions that were applied for each of the triples; and resulting status, performance, lifetime, economic value, or customer satisfaction for the set of technical devices providing the outcome after the set of actions were applied for each of the triples. The determined next action is one of a maintenance, repair, or replacement procedures that make up the set of possible actions.

According to an eleventh aspect of the present disclosure, the machine learning method of any of the fourth through ninth aspects further includes having the historical dataset include: a historical log of computational problems providing the state for each of the triples; devices or algorithms applied to the computational problems providing the actions that were applied for each of the triples; and resulting outcomes after applying the devices or algorithms to the computational problems providing the outcome after the set of actions were applied for each of the triples. The determined next action is one of devices or algorithms capable of being applied to the computational problems that make up the set of possible actions. The desired outcome is successfully computing a solution to the computational problems.

According to a twelfth aspect of the present disclosure, the machine learning method according to the eleventh aspect has the computational problems as machine learning problems or optimization problems.

According to a thirteenth aspect of the present disclosure, the machine learning method of any of the fourth through ninth aspects further includes having the historical dataset include: status of jobseekers providing the state for each of the triples; assigned activities to the jobseekers, comprising applying for jobs, training of skills, or health recovery activities, providing the actions that were applied for each of the triples; and resulting status of the jobseekers after applying assigned activities providing the outcome after the set of actions were applied for each of the triples. The determined next action is automatic loading of one of a plurality of activities in a training program, or automatic assigning of one of the activities to a jobseeker that make up the set of possible actions.

According to a fourteenth aspect of the present disclosure, the machine learning method of any of the fourth through ninth aspects further includes having the historical dataset include: a current sales status for a plurality of products under a plurality of conditions providing the state for each of the triples; price adjustments or advertising providing the actions that were applied for each of the triples; and resulting sales status after applying the price adjustments or advertising providing the outcome after the set of actions were applied for each of the triples. The determined next action includes an automatic pricing adjustment, automatic playback of an advertisement on a device, or an in-market announcement that make up the set of possible actions.

According to a fifteenth aspect of the present disclosure, a machine learning system is provided. The machine leaning system includes one or more hardware processors which, alone or in combination, are configured to: train a first action prediction model with a desired outcome subset of a historical dataset, the historical dataset having a plurality of triples, each of the triples comprising a corresponding set of: a past state; a set of actions that were applied; and an outcome after the set of actions were applied, the desired outcome subset being a selection of the triples from the historical dataset that have a first desired outcome as the outcome after the set of actions were applied, and the first prediction model is configured to receive an input state and to output an action selection probability under an assumption of the desired outcome, which represents a prediction of a probability of achieving the first desired outcome for each action included in a set of possible actions; train a second action prediction model with the entire historical dataset to minimize a total binary cross-entropy loss over all the actions in the set of possible actions, the second action prediction model being configured to receive the input state and to output an unconditional action selection probability, which represents a prediction of a probability of taking each of the actions included in the set of possible actions for the input state.

According to a sixteenth aspect of the present disclosure, the system is further configured to use the first action prediction model to determine the action selection probability under the assumption of the desired outcome based on using a new state as the input state; use the second action prediction model to determine the unconditional action selection probability based on using the new state as the input state; and determine, as a future action, the action from the set of possible actions that maximizes a pairwise ratio of the action selection probability under the assumption of the desired outcome over the unconditional action selection probability for the new state. The machine learning system according to the fifteenth aspect of the present disclosure may have its one or more processors configured to execute the corresponding features of the second through thirteenth aspects of the present disclosure.

According to a seventeenth aspect, the present disclosure provides a tangible, non-transitory computer-readable medium having instructions thereon which, upon being executed by one or more hardware processors, alone or in combination, provide for execution of the method of the third through fourteenth aspects of the present disclosure.

The present disclosure provides an improved offline machine learning system and method that overcomes at least the above-described limitations faced in the class of offline action selection machine learning problems described above. For example, embodiments of the present disclosure can be particularly applicable in scenarios where each action contributes to cover the needs of a given case. Moreover, embodiments provide methods and systems that effectively identify the action which is most relevant to achieve a desired target. Potential applications for the improved model include, among others: (a) selection of maintenance/repair/replacement procedures to optimize the lifetime of technical devices; (b) algorithm selection to maximize the success probability of a computational task; and (c) selecting measures to maximize job seeker's chances on the job market.

In an embodiment a system is provided for learning an action selection policy using machine learning models for a particular problem formulation. The system may include (or otherwise obtain) a dataset D comprising of a plurality of records (s, A, o) of prior attempts to address the problem. For example, each such record may contain information about the past state s, a set of actions A that were applied for the past state s, and an outcome o after the set of actions A had been applied to the state s. The records in the dataset D can be assumed to follow a probability distribution $p_0$, which can be an unknown probability distribution, defined over the space S of states, the set $A_{all}$ of all possible actions, and the set O of all possible outcomes. Further, $O_+ \subset O$ can define the set of desired outcomes, i.e., the subset of positive outcomes $O_+$ within the set O of all possible outcomes.

The machine learning system can be configured to learn a policy π, which can assign an action a from the set of all possible actions $A_{all}$ (i.e., $a \in A_{all}$) to any given state s from the space S of states (i.e., $s \in S$)—(i.e., $\pi: S \rightarrow A_{all}$), such that the likelihood of obtaining a desired outcome is maximized under assumption of the probability distribution $p_0$ for the generation of the remaining action set A. In embodiments, a single action a can be assigned to a given state s to maximize the likelihood of a desired outcome, while the remaining actions in the set of all possible actions $A_{all}$ can retain the same probability distribution $p_0$ before assigning the single action a to the given state s.

In an embodiment implementing a machine learning system according to the present disclosure, the policy it can be applied multiple times in order to generate a promising action set A for a given initial state s. For example, the machine learning system can predict a series of actions, or an entire action set, by iteratively applying an embodiment of the disclosed method several times as follows:

1) applying the method to select an action a given the current state s;
2) applying the action a;
3) replacing the state s with the state s' obtained as a result of the action application; and
4) repeating steps 1)-3).

In another embodiment implementing a machine learning system of the present disclosure, only the single best action is applied, which leads the target system into a new state s'. From s' onwards, an assessment can be undertaken to decide whether further actions will be necessary, e.g., assessing whether the new state s' is sufficiently close to the desired outcome $O_+$. This assessment from s' onwards can include a criterion for termination, when no further actions will be necessary. For example, if the space S of states and the set O of all possible outcomes becomes identical, the process could be terminated as soon as the new state s', having replaced the current state s, is among the desired outcomes $O_+$.

In another embodiment implementing a machine learning system of the present disclosure, the selected action is not applied automatically by the system, but can serve as an insight for decision making by another system.

In an embodiment implementing a machine learning system of the present disclosure, the system is configured on the following solution principle and configured to execute the following solution architecture.

The following reasoning shows a basis for the correctness of the method: when o is an outcome, a is an action, A is the set of actions, O is the set of all outcomes, $O_+$ is the set of desired outcomes, and $P_{p0}$ is a notation to express the probability under the distribution $p_0$, given state s, where $P_{p0}$ can be a scalar probability. The target is to identify the action which maximizes the probability of the outcome being a member of $O_+$. This can be expressed as formula (1):

$$\arg\max_a P_{p0}[o \in O_+ | a \in A, s], \quad (1)$$

Applying a Bayesian formula it is possible to transform formula (1) into the equivalent formula (2), where formula (2) expresses the maximum, over all actions a, of the ratio between first, the product of the probability $P_{p_0}$ under the distribution $p_0$ that action a is among the selected actions A under the condition that the outcome o is a member of the desired outcomes $O_+$ in the given state s, and the probability $P_{p_0}$ under the distribution $p_0$ that the outcome o is among the desired outcomes $O_+$ in the given state s, and second, the probability $P_{p_0}$ under the distribution $p_0$ that the action a is among the selected actions A for the given states s as the denominator:

$$\arg\max_a P_{p_0}[a\in A|o\in O_+,s]\cdot P_{p_0}[o\in O_+|s]/P_{p_0}[a\in A|s]. \quad (2)$$

As the second factor is independent from the selected action, that probability $P_{p_0}$ under the distribution $p_0$ that the specific outcome o of the set of all possible desired outcomes $O_+$ will be true, e.g., will occur, in the given state s, the expression can be simplified to:

$$\arg\max_a P_{p_0}[a\in A|o\in O_+,s]/P_{p_0}[a\in A|s]. \quad (3)$$

Because formula (1) expresses the action which maximizes the desired probability, and formula (3) is shown to be equivalent to formula (1), embodiments of the present application can then compute $\arg\max_a P_{p_0}[a\in A|o\in O_+, s]/P_{p_0}[a\in A|s]$ to predict an action a that maximizes that ratio. Embodiments of the present disclosure can compute formula (3), then, to predict an action a.

Figure 1:
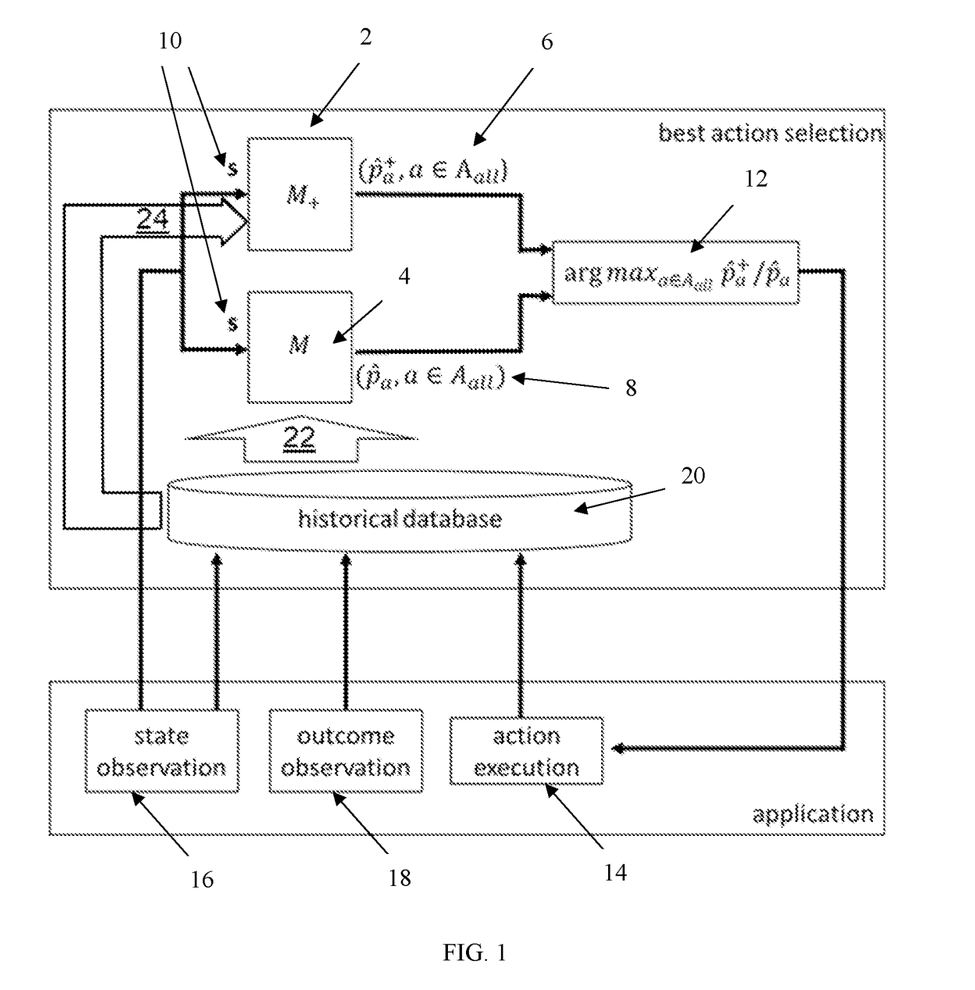
FIG. 1 illustrates an implementation of the machine learning system architecture according to an aspect of the present disclosure.

FIG. 1 illustrates an implementation of the machine learning system architecture according to an embodiment of the present disclosure.

The machine learning system 1 includes two machine learning models, denoted $M_+$ 2 and M 4. $M_+$ 2 is trained to predict $\hat{p}_a^+$, e.g., $P_{p_0}[a\in A|o\in O_+, s]$, a probability of a successful or desired outcome, e.g., an action selection probability under assumption of success, while the model M 4 is trained to predict $\hat{p}_a$, e.g., $P_{p_0}[a\in A|s]$. The system 1 can also include as a historical database D 20, which includes various record, e.g., the state observations 16, the outcome observations 18, and the action executions 14.

The input 10 of M 4 is a state s, and model M 4 has a dedicated output 8 of $\hat{p}_a$, where $\hat{p}_a$ is the estimated probability that a is in the set A for state s, with $0\leq \hat{p}_a \leq 1$ for each action $a\in A_{all}$. The input 10 of state s can be a new given state s to be determined, or can be pulled from the historical records, e.g., from state observations 16. The model M 4 is trained with all samples 22 from the historical database D 20 to minimize the total binary cross-entropy loss over all actions, that is, $$-\frac{1}{|D|}\sum_{(s,A,o)\in D}\sum_{a\in A_{all}}(\delta_{a\in A}\log\hat{p}_a + (1-\delta_{a\in A})\log(1-\hat{p}_a)),$$

where $\delta_{a\in A}\in\{0,1\}$ is defined to be 1 if and only $a\in A$. The cross-entropy loss has minimal value when the estimated probabilities of the model, e.g., $\hat{p}_a$, match with the true probabilities $p_0$. Therefore, by minimizing the loss, the model can be trained to learn those probabilities $p_0$, where $p_0$ can represent the true probability distribution of the model.

The input 10 and output 6 of $M_+$ 2 is similar to M 4: the input 10 is the states and output 6 where the output 6 vector is $(\hat{p}_a^+)_{a\in A_{all}}$. In contrast to M 4, $M_+$ 2 is trained only with successful samples 24, that is, it is trained to minimize:

$$-\frac{1}{|D_+|}\sum_{(s,A,o)\in D_+}\sum_{a\in A_{all}}(\delta_{a\in A}\log\hat{p}_a^+ + (1-\delta_{a\in A})\log(1-\hat{p}_a^+)),$$

where $D_+=\{(s, A, o)\in D | o\in O_+\}$ is the set of samples with desired outcome.

Once the models $M_+$ 2 and M 4 are trained, the predicted best action 12 for a given state s is selected by computing:

$$\arg\max_{a\in A_{all}}\hat{p}_a^+/\hat{p}_a.$$

Computationally, this involves evaluating the models M 4 and $M_+$ 2 for input 10 of state s, computing the component-wise ratio of the model outputs 6 and 8, and maximizing over the results. This is computationally a very efficient procedure as it involves only a single forward pass over the models M 4 and $M_+$ 2.

Figure 2:
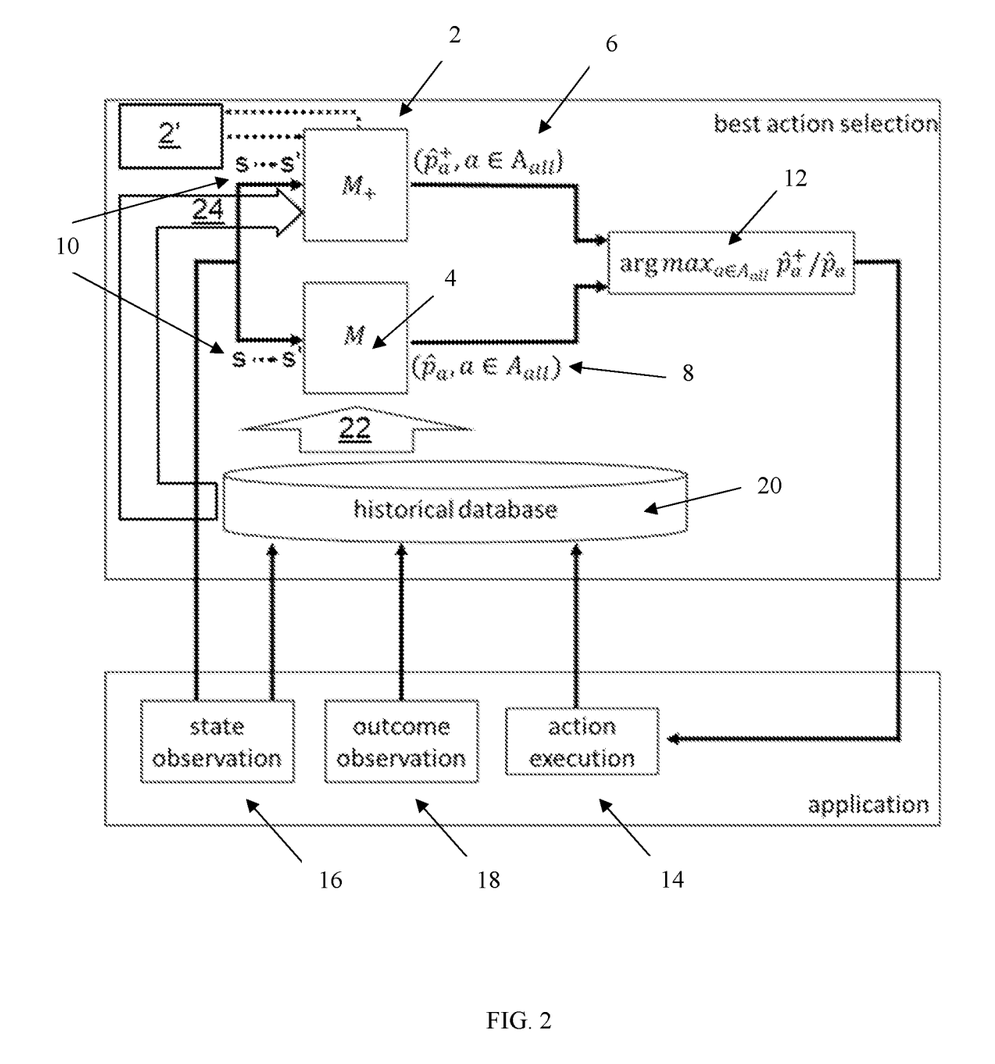
FIG. 2 illustrates an embodiment of the machine learning system architecture according another aspect of the present disclosure.

Embodiments of the present disclosure can be extended to further desired outcomes, as shown in the embodiment of FIG. 2. For example, when the desired process outcomes are changing, or when further desired outcomes are identified, the system 1 can be adapted or extended in an efficient manner. Assuming a new set of desired outcomes, for example $O'_+$, a machine learning model $M'_+$ 2' to predict $P_{p_0}[a\in A|o\in O'_+,s]$, is trained from the historical records, e.g., historical database D 20, where an outcome from $O'_+$ was reached. The $M'_+$ 2' then replaces $M_+$ 2 in the architecture, whereas model M 4 remains unchanged.

Similarly, the policy $\pi$ can be applied multiple times in order to generate a promising action set A for a given initial state s. For example, the machine learning system can predict a series of actions, or an entire action set, by applying iteratively an embodiment of the disclosed method multiple times. As shown in FIG. 2, after the method selects an action a given the current state s and applies that action a, the input 10 of state s can be replaced by the input 10 of new state s' obtained as a result of the action application. The steps can then be repeated as needed.

The embodiment of FIG. 2 is capable of applying the best action and determining further actions based on the application of the best action. Applying the best action leads the system into a new state s'. From s' an assessment can be undertaken to decide whether further actions will be necessary, e.g., assessing whether the new state s' is sufficiently close to the desired outcome O+. This assessment or threshold check from s' onwards can include a criterion for termination, when no further actions will be necessary. For example, if the space S of states and the set O of all possible outcomes becomes identical, the process could be terminated as soon as the new state s', having replaced the current state s, is among the desired outcomes.

According to an embodiment, the training of $M_+$ 2 can be adapted for improved stability. In cases where the cardinality of $D_+=\{(s, A, o)\in D | o\in O_+\}$ is insufficient for obtaining a good quality model $M_+$ 2, the complementary set $\overline{D}_+=D-D_+=\{(s, A, o)\in D | o\notin O_+\}$ can be used for training a model $\overline{M}_+$ to predict $P_{p_0}[a\in A|o\notin O_+,s]$.

When using $\overline{M}_+$ instead of $M_+$ 2 in the system depicted in FIG. 1, the maximization $\arg\max_{a\in A_{all}}$ is also replaced by $\arg\min_{a\in A_{all}}$. The resulting action will minimize the probability that a desired process outcome will not be achieved, which is equivalent to maximizing the probability that a desired outcome will be achieved in some settings.

A machine learning system and method of the present disclosure may, for example, be implemented for selection and execution of procedures of inspection, repair, maintenance, and/or replacement of parts to maximize the lifetime and value of complex devices.

In the manufacturing sector, an upcoming trend in Europe and beyond is the transition to a circular economy, reducing the carbon footprint and consumption of raw materials (e.g., the European Union has launched the Circular Economy Action Plan). The NEC OBBLIGATO platform for product lifecycle management is, for instance, a suitable path for implementing a machine learning system according to the present disclosure to adapt technologies into the curricular economy domain in manufacturing. See NEC OBBLIGATO, at <<www.nec.com/en/global/solutions/obbligato/index.html>> (last retrieved May 26, 2022) (the entire contents of which is hereby incorporated by reference herein).

Existing systems for predictive maintenance only consider the system to be maintained as a single, monolithic unit, where the decision is limited to scheduling a single maintenance procedure for the unit. See, e.g., Wetzer, Michael, "Performing predictive maintenance on equipment," U.S. Pat. No. 6,738,748 (the entire contents of which is hereby incorporated by reference herein). Such existing approaches are incompatible with the new circular economy paradigm of recycling, reusing, replacing and repairing individual product components.

A machine learning system and method according to the present disclosure, however, may be given a set of technical devices and a set of maintenance, repair, and/or replacement procedures, and may be configured to decide which procedure to apply to a given device. Historical data about past maintenance and device status can be obtained and included in the historical records such as historical database D 20, and the task can be configured to select, for a given device, the most important next procedure, e.g., approximately best action 12, so as to optimize objectives like the lifetime, economic value, and/or customer satisfaction.

Such a machine learning system and method would be capable of determining problems and maintenance needs for given devices, and for executing the selected procedures.

A machine learning system and method of the present disclosure may, for example, be implemented for algorithm and device selection for computational tasks on resource-constrained devices (e.g., internet of things (IoT), edge, and or cloud computing).

A machine learning system and method according to the present disclosure may be given a historical log of computational problems (e.g. machine learning or optimization problems) and the devices and algorithms applied to them, and may be configured to perform the task of selecting an algorithm and device for a given problem that has a high likelihood to successfully compute a solution to the problem.

The selected algorithm may then be executed on a selected device.

A machine learning system and method of the present disclosure may, for example, be implemented for action recommendation in job centers. For example, a machine learning system may be deployed as a decision support tool for identifying the most relevant actions to shorten unemployment periods. A machine learning system and method according to the present disclosure may be given historical data about jobseekers and their assigned activities (applying for jobs, trainings of basic skills, training of specialized skills, health recovery activities), and configured to identify an activity for a given job seeker that increases the likelihood to of success in the job marked in the future. The system may be implemented to provide automatic loading of online training programs on devices, and/or automatic subscription to suitable job advertisement channels.

A machine learning system and method of the present disclosure may, for example, be implemented to select the most effective sales boosting campaigns. For example, there may be a need to select appropriate measures (e.g., price, discounts, advertisements, etc.) for a particularly company. The company may be capable of predicting sales from a set of given measures, but the company may not yet know what measures for specific sales targets should be taken. A machine learning system and method according to the present disclosure may be given historical data about sales under various conditions, and the sales target can be configured as the desired outcome. The machine learning system can be pre-trained for several different sales targets and selected on a daily or weekly basis. Such a system can be configured to determine automatic pricing and/or automatic playback of advertising campaigns on screens or as in-market announcements.

A machine learning system according to the present disclosure may be configured to perform a method comprising:

Operation 1: Treat the actions recorded in historical process data as a set, and determine the future action whose membership in the set will maximize the probability of a successful process outcome;

Operation 2: Execute Operation 1 by: maximizing, over all actions, the success probability resulting from the action, by maximizing the ratio of (a) the action selection probability under assumption of success, and (b) the unconditional action selection probability;

Operation 3: Prepare for Operation 2 by: training a pair of action prediction models, where one of the models is trained with the historical records with positive outcome, and the other one trained with all historical records, and combining the prediction results of the two models (as described in Operation 2) to obtain the most promising next action;

Operation 4: Train an additional action prediction model for an additional (different) set of desired outcomes, and combine the additional prediction model together with the already existing model that was trained with all historical records (as described in Operation 3), in order to obtain the most promising next action for achieving the additional outcome; and/or Operation 5: Train an action prediction model with the historical records where the desired outcome was not achieved, and combining the resulting model output with the output of the model that was trained with all historical records (as described in Operation 3) using minimization instead of maximization, in order to have an alternative and potentially more reliable method for selecting the most promising next action.

A machine learning system according to the present disclosure may be configured to perform a method for action selection comprising:

Operation A: Training a pair of models, M 4 and $M_+$ 2 with a historical dataset D 20 comprising (state 16, action set 20, outcome 18)-records, Operation Ai: where M 4 is trained to with all records 22 from historical dataset D 20 to predict the probability of each action to be in the action set 20, and Operation Aii: $M_+$ 2 is trained for the same task with only records from historical dataset D 20 with positive outcome 24 (see also, Operation 3, above).

Operation B: Given input 10 of a new state s', evaluating the two models described in Operation A to predict the probabilities of all actions, and computing the pairwise ratio of the probabilities (see also, Operation 2, above); and/or Operation C: Apply the action which maximizes the ratio computed in Operation B.

An advantageous feature of one or more systems and methods of the present disclosure is that they may be applicable to cases where the particular order of action application is not essential for success.

The improved machine learning systems and methods of the present disclosure provide improvements that are rooted in the field of computer processing, in particular to the field of machine learning. An improvement provided by aspects of the present disclosure includes computing near-optimal action selection from given historical data in a simple and robust way. Another improvement provided by aspects of the present disclosure is that it provides enhanced stability. State of the art reinforcement learning methods suffer from stability problems, as they are designed for a much more complicated problem setup.

The present disclosure also provides a system and method that has improved computational efficiency comparted to the state of the art. For example, state of the art methods require much more heavy machinery (e.g. RL for full MDP) which comes with more stability problems and needs much more data and computational resources.

Another feature of one or more systems and methods of the present disclosure is that they may determine single actions in face of processes that involve several actions.

An embodiment according to the present disclosure has been implemented, and initial experiments have been performed with synthetic data, with 50 requirements per case to be satisfied by actions. In the training data, 34% of the cases had a successful outcome. Training the system from this data has resulted in over 90% of successfully solved cases, which was evaluated on an independent test set.

Figure 3:
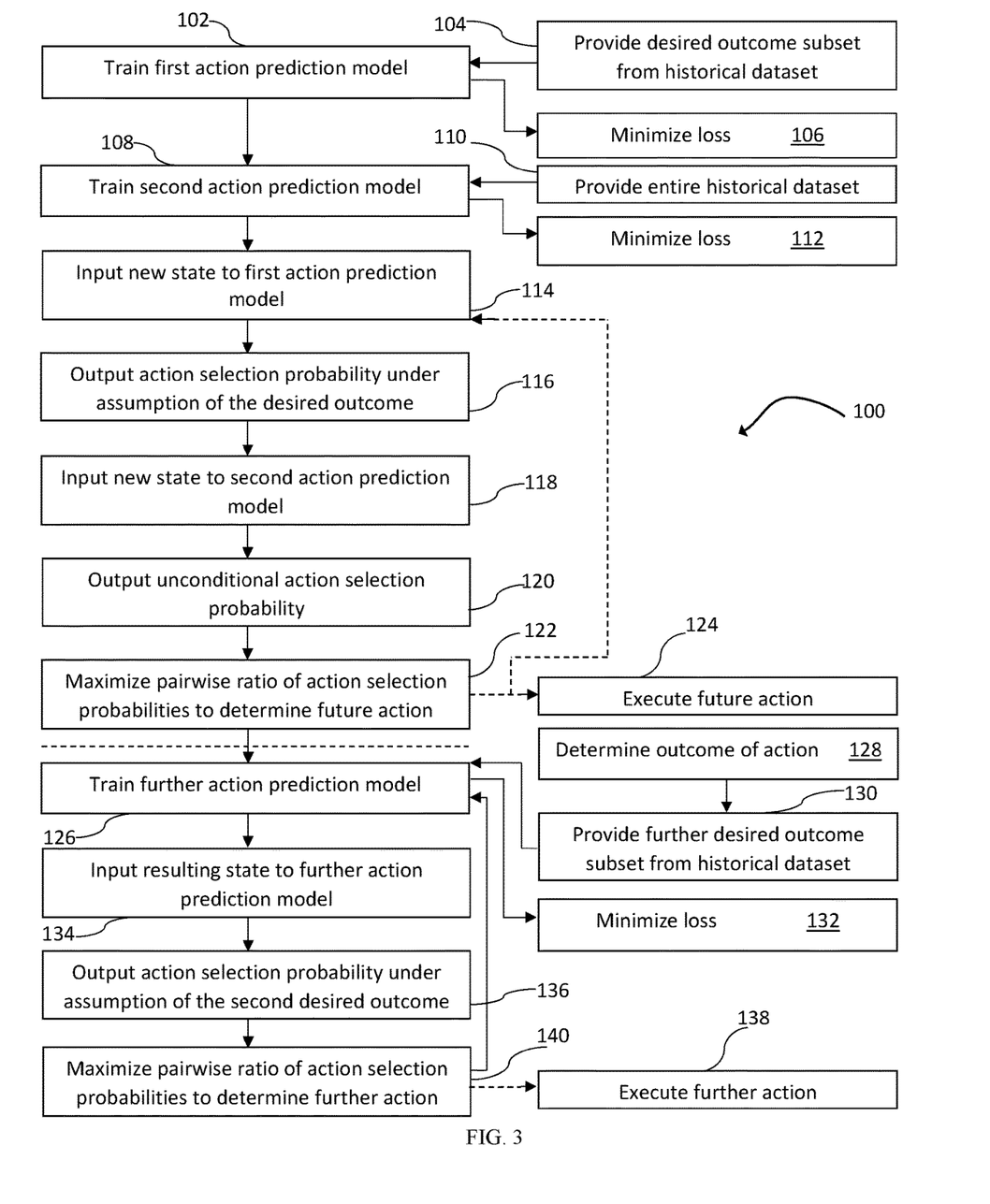
FIG. 3 illustrates a machine learning method according to an aspect of the present disclosure.

FIG. 3 shows an embodiment 100 of a machine learning method according to the present disclosure that can be used for various functions, e.g., automatic action determination. In step 102, a first action prediction model, e.g., $M_+$ 2, can be trained with a desired outcome subset, e.g., successful samples 24, of a historical dataset, e.g., historical dataset 20, that is provided in step 104. The historical dataset can comprise a plurality of triples, and each of those triples can comprise a corresponding set of a past state, e.g., the state observations 16; a set of actions that were applied 14, e.g., the action executions 14; and an outcome after the set of actions were applied, e.g., the outcome observations 18. The desired outcome subset is a selection of the triples from the historical dataset that have a first desired outcome as the outcome after the set of actions were applied. The training of step 102 can include many operations, e.g., minimizing a cross-entropy loss. The first prediction model can receive an input state and output an action selection probability under an assumption of the desired outcome. This action selection probability under an assumption of the desired outcome represents a prediction of a probability of achieving the first desired outcome for each action included a set of possible actions.

In step 108, a second action prediction model, e.g., M 4, can be trained with the entire historical dataset provided in step 110. The training of step 108 can include many operations, e.g., minimizing a total binary cross-entropy loss over all the actions in the historical dataset in the set of possible actions. The second action prediction model can receive the input state and can output an unconditional action selection probability. The unconditional action selection probability can represent a prediction of a probability of taking each of the actions included in the set of possible actions for the input state.

In step 114, the first action prediction model can use a new state as the input state, e.g., input 10, and in step 116 the first action prediction model can determine the action selection probability under the assumption of the desired outcome based on using the new state as the input state. In step 118, the second action prediction model can also use the new state as the input state, and in step 120 the second action prediction model can determine the unconditional action selection probability based on using the new state as the input state. Steps 114 and 116 may be performed consecutively or contemporaneously with steps 118 and 120.

In step 122, a determination of an action, e.g., a potential future action, can occur by determining the action from the set of possible actions that maximizes a pairwise ratio of the action selection probability under the assumption of the desired outcome over the unconditional action selection probability for the new state. In the optional step 124, the action determined in step 122 can be executed. To assist in a possible iterative sequence in the embodiment of FIG. 3, a threshold check may occur after step 122 or 124. The threshold check can assess the result of the action determined in step 122 or executed in step 124, and determine if a new action should be found or if the method can be terminated. If a new action should be found, the determined action in step 122 and/or the outcome of step 124 of executing the future action can then be provided as part of the input state in steps 114 and 118, and the embodiment of FIG. 3 can then be performed again iteratively as needed.

Alternatively, the threshold check may determine that a further action prediction model should be trained as in step 126, but step 126 is not required to follow a threshold check. In step 128, the outcome of step 124, executing the future action, can be included into the historical dataset if desired and/or if step 124 is performed. If step 124 is not performed, step 128 need not be performed. In step 130, the further action prediction model is provided with the second desired outcome subset. The second desired outcome subset can be a second selection of the triples from the historical dataset that have one outcome from a second set of desired outcomes as the outcome after the set of actions were applied in step 124. In the training of the further action prediction model, a step 132 can occur where the further action prediction model is trained so as to minimize a loss value. The further action prediction model can be configured to receive the input state and to output an action selection probability under an assumption of the second set of desired outcomes, which represents a prediction of a probability of achieving one of the outcomes from the second set desired outcomes for each action included in the set of possible actions.

In step 134, the third action prediction model can receive the further state or resulting state from the execution of the future action in step 124. In step 136 the third action prediction model can determine the action selection probability under the assumption of the second set of desired outcomes based on using the further or resulting state as the input state. Steps 118 and 120 can then be performed again, where the second action prediction model can also use the further or resulting state as the input state, and in step 120 the second action prediction model can determine the unconditional action selection probability based on using the further or resulting state as the input state.

In step 140, a determination of a next action can be made of the action from the set of possible actions that maximizes a pairwise ratio of the action selection probability under the assumption of the second set of desired outcomes over the unconditional action selection probability for the further state. In the optional step 138, that next action can be executed.

Figure 4:
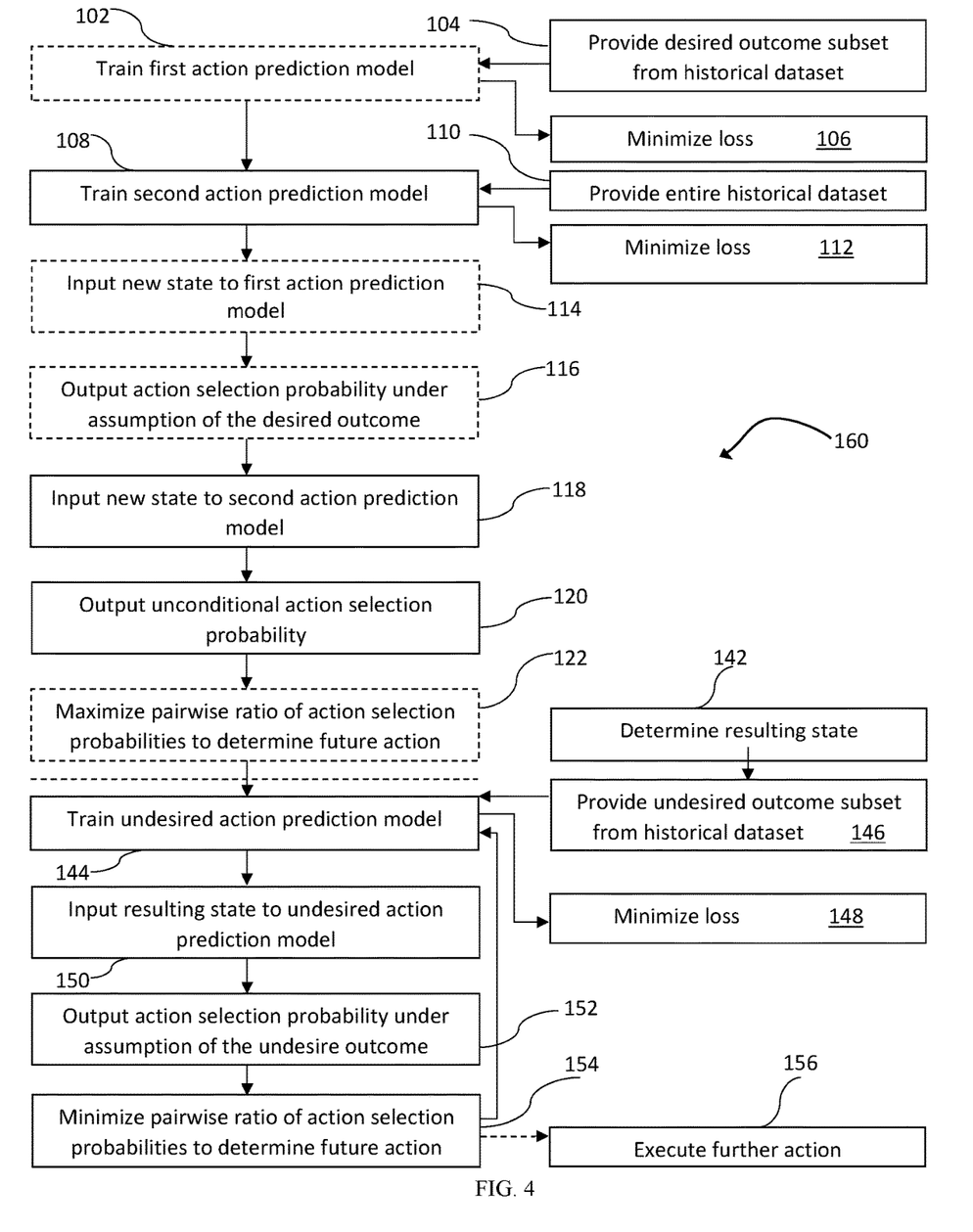
FIG. 4 illustrates a machine learning method according to an aspect of the present disclosure operable with other embodiments.

FIG. 4 shows an embodiment of a machine learning method 160 according to the present disclosure that can be used for various functions, e.g., automatic action determination. The embodiment of FIG. 4 can include some or all of the steps of the embodiment of FIG. 3, e.g., by being used in combination with the embodiment of FIG. 3 or by optionally employing an undesired action prediction model as a replacement to the first action prediction model, rendering some of the steps, e.g., steps 102, 114, 116, and steps 122 to steps 138, of FIG. 3 optional.

If used in combination with the steps of FIG. 3, in step 144, an undesired action prediction model can be trained with an undesirable outcome subset of the historical dataset 20. The undesirable outcome subset can be another selection of the triples from the historical dataset 20 that do not have the first desired outcome as the outcome after the set of actions were applied. The third prediction model can be configured to receive the input state and to output an action selection probability under an assumption of undesirable outcome, which represents a prediction of a probability of achieving an outcome that is not the first desired outcome for each action included in the historical dataset. In step 150, the undesired action prediction model can use the same new state as the new state used by the second action prediction model, or can use a resulting state of a prior action execution, e.g., steps 124, 138. In step 152, the third action prediction model can determine the action selection probability under the assumption of the undesirable outcome based on using the new state as the input state or based on using the resulting state as the input state. In step 154, a determination of an alternative action can be made of the action from the set of possible actions that minimizes a pairwise ratio of the action selection probability under the assumption of the undesirable outcome over the unconditional action selection probability for the new state or the resulting state. In step 156, the determined alternative action of step 154 can be executed.

If used to replace the first action prediction model of FIG. 3, an exemplary embodiment could be employed such that step 144 can replace step 102, step 146 can replace step 104, step 148 can replace step 106, step 150 can replace step 114, step 152 can replace steps 116, and step 154 can replace step 102.

In addition to steps 126 to steps 140 and steps 144 to steps 156 being optional, they may also be used as alternatives or in parallel to other steps of the embodiments of FIGS. 3 and 4. For example, a method following the embodiment of FIG. 3 may use the same state used for steps 114, 118 instead of a resulting state from step 124, and execute steps 114 through 122 in parallel with steps 134, 136, 140. Using the same state, the determination of step 140 can be used in combination with step 122 in a number of ways, e.g., as alternative actions or as combined set of actions to execute as a set of actions. Similarly, steps 150 through steps 154 or 156 may be executed in parallel with other steps, e.g., steps 114 through 122 and steps 134, 136, 140.

While steps 126 to step 138 and steps 144 to steps 154 are optional, some steps within steps 126 to 138 and steps 144 to steps 154 may be performed while other steps need not be performed, and some steps may be performed in some iterations but not in others. For example, a method following the embodiment of FIG. 3 may train the further action prediction model in step 126, but may or may not include the determined outcome 128 of the determined future action of step 122 in the historical dataset, as in step 130, or may skip the steps of 126, 128, 130, and 132. Similarly, step 128 may not be performed in some iterations. Step 128 can then be performed in a desired iteration, e.g., the first iteration of method 100 or the n-th iteration, and incorporate some or all of the determined outcomes of the future action determined in step 122. Additionally, after step 102 of training the first action prediction model and step 108 of training the second action prediction model are performed, a subsequent iteration may not need to perform step 102 and step 108 again in order to perform other steps, e.g., steps 116, 118.

The steps of the embodiments of FIGS. 3 and 4 can be performed in whatever order is needed. For example, step 108 of training the second action prediction model is not required to follow step 102 of training the first action prediction model, nor is step 108 required to be performed before step 114. Additionally, the optional step 126 of training a further action prediction model is not required to follow step 124 of executing the future action or step 122 of maximizing the pairwise ratio of action selection probabilities to determine the future action. Step 126 may occur sequentially after step 122, or may also occur in parallel with step 122, e.g., by using the same new state as the input as the new state that was used as the input for steps 114 and 118. Other steps can be executed in parallel, e.g., training the action prediction models in steps 102, 108, or making the predictions of steps 122, 154.

Figure 5:
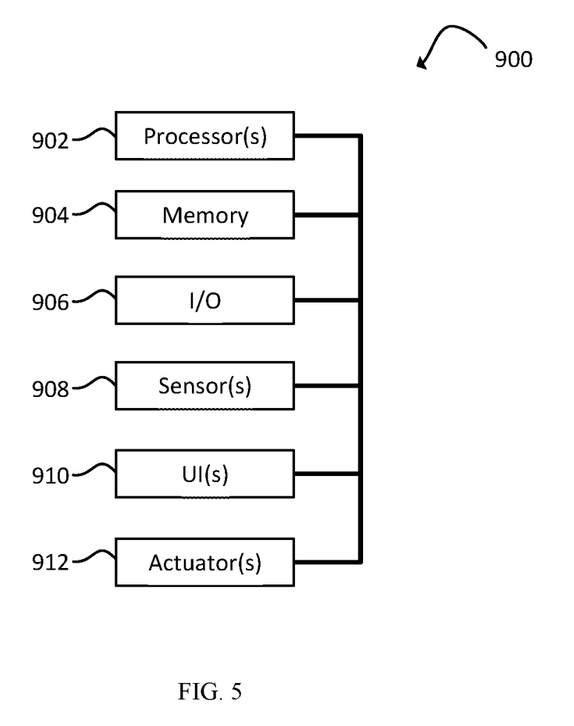
FIG. 5 illustrates a processing system according to the present disclosure.

Referring to FIG. 5, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted to a common substrate or to multiple different substrates.

Processors 902 are configured to perform a certain function, method, or operation (e.g., are configured to provide for performance of a function, method, or operation) at least when one of the one or more of the distinct processors is capable of performing operations embodying the function, method, or operation. Processors 902 can perform operations embodying the function, method, or operation by, for example, executing code (e.g., interpreting scripts) stored on memory 904 and/or trafficking data through one or more ASICs. Processors 902, and thus processing system 900, can be configured to perform, automatically, any and all functions, methods, and operations disclosed herein. Therefore, processing system 900 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 900 can be configured to perform task "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include remotely hosted (e.g., cloud) storage.

Examples of memory 904 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. For example, some components of processing system 900 can reside in a remote hosted network service (e.g., a cloud computing environment) while other components of processing system 900 can reside in a local computing system. Processing system 900 can have a modular design where certain modules include a plurality of the features/functions shown in FIG. 5. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A machine learning method for automatic action determination, the method comprising:
    training a first action prediction model with a desired outcome subset of a historical dataset, wherein:
        the historical dataset comprises a plurality of triples, each of the triples comprising a corresponding set of: a past state; a set of actions that were applied; and an outcome after the set of actions were applied,
        the desired outcome subset is a selection of the triples from the historical dataset that have a first desired outcome as the outcome after the set of actions were applied, and
        the first action prediction model is configured to receive an input state and to output an action selection probability under an assumption of the first desired outcome, which represents a prediction of a probability of achieving the first desired outcome for each action included in a set of possible actions; and
    training a second action prediction model with the entire historical dataset to minimize a total binary cross-entropy loss over all the actions in the set of possible actions, the second action prediction model being configured to receive the input state and to output an unconditional action selection probability, which represents a prediction of a probability of taking each of the actions included in the set of possible actions for the input state.

2. The machine learning method of claim 1, the method comprising:
    using the first action prediction model, determining the action selection probability under the assumption of the first desired outcome based on using a new state as the input state;
    using the second action prediction model, determining the unconditional action selection probability based on using the new state as the input state; and
    determining, as a future action, the action from the set of possible actions that maximizes a pairwise ratio of the action selection probability under the assumption of the first desired outcome over the unconditional action selection probability for the new state.

3. The machine learning method of claim 2, the method comprising:
    training a third action prediction model with a second desired outcome subset of the historical dataset, wherein:
        the second desired outcome subset is a second selection of the triples from the historical dataset that have one outcome from a second set of desired outcomes as the outcome after the set of actions were applied, and
        the third prediction model is configured to receive the input state and to output an action selection probability under an assumption of the second set of desired outcomes, which represents a prediction of a probability of achieving one of the outcomes from the second set desired outcomes for each action included in the set of possible actions; and
    using the third action prediction model, determining the action selection probability under the assumption of the second set of desired outcomes based on using a further state as the input state;

using the second action prediction model, determining the unconditional action selection probability based on using the further state as the input state; and determining, as a next action, the action from the set of possible actions that maximizes a pairwise ratio of the action selection probability under the assumption of the second set of desired outcomes over the unconditional action selection probability for the further state.

4. The machine learning method of claim 3, wherein the second set of desired outcomes does not comprise the first desired outcome.

5. The machine learning method of claim 2, the method comprising:

training a third action prediction model with an undesirable outcome subset of the historical dataset, wherein:
the undesirable outcome subset is another selection of the triples from the historical dataset that do not have the first desired outcome as the outcome after the set of actions were applied, and
the third prediction model is configured to receive the input state and to output an action selection probability under an assumption of undesirable outcome, which represents a prediction of a probability of achieving an outcome that is not the first desired outcome for each action included in the historical dataset; and using the third action prediction model, determining the action selection probability under the assumption of the undesirable outcome based on using the new state as the input state; and determining, as an alternative action, the action from the set of possible actions that minimizes a pairwise ratio of the action selection probability under the assumption of the undesirable outcome over the unconditional action selection probability for the new state.

6. The machine learning method according to claim 2, the method comprising executing the future action.

7. The machine learning method according to claim 6, the method comprising:

determining a further state resulting from executing the future action in the new state;
using the first action prediction model, determining the action selection probability under the assumption of the desired outcome based on using the further state as the input state;
using the second action prediction model, determining the unconditional action selection probability based on using the further state as the input state;
determining, as a next action, the action from the set of possible actions that maximizes the pairwise ratio of the action selection probability under the assumption of the desired outcome over the unconditional action selection probability for the further state; and
executing the next action.

8. The machine learning method according to claim 2, wherein the historical dataset comprises:

past maintenance statuses for a set of technical devices providing the state for each of the triples;
past maintenance, repair, or replacement procedures providing the actions that were applied for each of the triples; and
resulting status, performance, lifetime, economic value, or customer satisfaction for the set of technical devices providing the outcome after the set of actions were applied for each of the triples, and wherein the determined future action is one of a maintenance, repair, or replacement procedures that make up the set of possible actions.

9. The machine learning method according to claim 2, wherein the historical dataset comprises:

a historical log of computational problems providing the state for each of the triples;
devices or algorithms applied to the computational problems providing the actions that were applied for each of the triples; and
resulting outcomes after applying the devices or algorithms to the computational problems providing the outcome after the set of actions were applied for each of the triples, wherein the determined future action is one of devices or algorithms capable of being applied to the computational problems that make up the set of possible actions, and wherein the desired outcome is successfully computing a solution to the computational problems.

10. The machine learning method according to claim 9, wherein the computational problems are machine learning problems or optimization problems.

11. The machine learning method according to claim 2, wherein the historical dataset comprises:

status of jobseekers providing the state for each of the triples;
assigned activities to the jobseekers, comprising applying for jobs, training of skills, or health recovery activities, providing the actions that were applied for each of the triples; and
resulting status of the jobseekers after applying assigned activities providing the outcome after the set of actions were applied for each of the triples, and wherein the determined future action is automatic loading of one of a plurality of assignable activities in a training program, or automatic assigning of one of the assignable activities to a jobseeker that make up the set of possible actions.

12. The machine learning method according to claim 2, wherein the historical dataset comprises:

a current sales status for a plurality of products under a plurality of conditions providing the state for each of the triples;
price adjustments or advertising providing the actions that were applied for each of the triples; and
resulting sales status after applying the price adjustments or advertising providing the outcome after the set of actions were applied for each of the triples, and wherein the determined future action comprises an automatic pricing adjustment, automatic playback of an advertisement on a device, or an in-market announcement that make up the set of possible actions.

13. A machine learning system comprising one or more hardware processors which, alone or in combination, are configured to:

train a first action prediction model with a desired outcome subset of a historical dataset, wherein:
the historical dataset comprises a plurality of triples, each of the triples comprising a corresponding set of: a past state; a set of actions that were applied; and an outcome after the set of actions were applied,
the desired outcome subset being a selection of the triples from the historical dataset that have a first desired outcome as the outcome after the set of actions were applied, and
the first action prediction model is configured to receive an input state and to output an action selection probability under an assumption of the first desired outcome, which represents a prediction of a probability of achieving the first desired outcome for each action included in a set of possible actions;

train a second action prediction model with the entire historical dataset to minimize a total binary cross-entropy loss over all the actions in the set of possible actions, the second action prediction model being configured to receive the input state and to output an unconditional action selection probability, which represents a prediction of a probability of taking each of the actions included in the set of possible actions for the input state.

14. The machine learning system of claim 13, further configured to:

use the first action prediction model to determine the action selection probability under the assumption of the first desired outcome based on using a new state as the input state;

use the second action prediction model to determine the unconditional action selection probability based on using the new state as the input state; and determine, as a future action, the action from the set of possible actions that maximizes a pairwise ratio of the action selection probability under the assumption of the first desired outcome over the unconditional action selection probability for the new state.

15. A tangible, non-transitory computer-readable medium having instructions thereon which, upon being executed by one or more hardware processors, alone or in combination, provide for execution of the machine learning method of claim 1.

* * * * *